United States Patent
Suranov

(12) 
(10) Patent No.: US 11,392,866 B2
(45) Date of Patent: Jul. 19, 2022

(54) DEVICES, SYSTEMS AND METHODS FOR MANAGING TECHNICIAN LOGISTICS

(71) Applicant: DISH Ukraine L.L.C., Englewood, CO (US)

(72) Inventor: Oleksii Suranov, Kharkov (UA)

(73) Assignee: DISH Ukraine L.L.C., Kharkov (UA)

( * ) Notice: Subject to any disclaimer, the term of this patent is extended or adjusted under 35 U.S.C. 154(b) by 73 days.

(21) Appl. No.: 16/792,810

(22) Filed: Feb. 17, 2020

(65) Prior Publication Data

US 2021/0256455 A1 Aug. 19, 2021

(51) Int. Cl.
*G06Q 10/06* (2012.01)

(52) U.S. Cl.
CPC .......... *G06Q 10/063114* (2013.01); *G06Q 10/06395* (2013.01); *G06Q 10/06398* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 2015/0302345 A1* | 10/2015 | Bartlett | .......... | G06Q 10/063118 705/7.17 |
| 2018/0032944 A1* | 2/2018 | Sarvana | .......... | G06Q 10/063114 |
| 2020/0210963 A1* | 7/2020 | Parash | .......... | G06Q 10/20 |
| 2022/0012653 A1* | 1/2022 | Bianchi | .......... | G06K 9/6223 |

OTHER PUBLICATIONS

Ukraine, "Hygienic Classification of Labor According to Indicators of Harmfulness and Danger of Factors . . . ", "Hygienic Classification of Labor . . . ", Apr. 8, 2014, p. 43, No. 248, Publisher: Ministry of Health, Published in Ukraine.

* cited by examiner

*Primary Examiner* — Patricia H Munson
*Assistant Examiner* — Marjorie Pujols-Cruz
(74) *Attorney, Agent, or Firm* — Wash Park IP Ltd.; John T. Kennedy

(57) ABSTRACT

Devices, systems and processes are described, for managing technician logistics. A process may include executing computer instruction for determining an estimated time of completion (ETC) for an assigned technician for a current task at a current service site. The ETC is determined based upon an average statistical time for task completion (ASTTC) for the current task. An ETC is based upon a stress differential (S) and a task complexity coefficient (TCC). The stress differential (S) is a difference between an expected stress level (SE) for the current task and a present stress level (SP) for the assigned technician. The SP is based upon data provided by a technician monitor, such as a biometric monitor. The stress differential (S) is weighted by a technician specific weighting factor (Tn), which is based on a technician rating. The TCC is based upon a task categorization (TC) specified by a regulatory body.

13 Claims, 4 Drawing Sheets

DEVICES, SYSTEMS AND METHODS FOR MANAGING TECHNICIAN LOGISTICS

TECHNICAL FIELD

The technology described herein generally relates to devices, systems, and processes for managing technician logistics. More specifically, the technology relates to devices, systems and processes for managing assignment of tasks to technicians based upon one or more skills and/or capabilities associated with each of a population of technicians as compared against one or more requirements associated with a given task. The technology described herein also relates to devices, systems and processes for managing routing, estimating time of arrival, and other parameters associated with a performance of a given task by a selected technician, and as such parameters are communicated to one or more users of a given device or system.

BACKGROUND

Homes, businesses, and other locations include ever more electronic devices, mechanical systems, and other elements. As such elements become ever more technologically involved, homeowners, business owners and others are commonly relying upon service providers to install, maintain, update, troubleshoot and otherwise address such elements. Yet, determining which technician to assign to a given task and for a given element can be quite complicated and involve a multi-factor analysis. Further, estimating how long a given task should take by an average technician, let alone a given technician, as well as a specific technician to use for a given task, the providing for any tools and/or resources needed by an assigned technician to accomplish a given task, determining and communicating with a user when a given technician will arrive at a job location (such arrival time being an estimated time of arrival or "ETA"), monitoring job and task performance, providing information regarding an estimated task completion ("ETC") such as completion time, costs, material used, and the like, and other concerns, today remain largely unaddressed challenges faced by service providers. Thus, a need exists for solutions which address the above and other logistical concerns. Such logistical concerns, when unaddressed, often give rise to inefficient utilization of technicians, untimely completion of tasks, late arrivals of technicians, poor service provider ratings, and other concerns.

More specifically, a range of jobs and tasks which a service provider may be requested to perform on behalf of a user is often quite expansive. For example, a provider of a content delivery services, such as a cable company, satellite television company, or other entity may face tasks involving the delivery of the content, as well as home networking issues, security, telephony, computing, Internet-of-Things (IoT), and/or other technologies. Thus, a given job or task may involve multiple, often disparate technologies, devices, systems, elements thereof, and the like. The service provider may have certain technicians who are capable of performing certain tasks (e.g., troubleshooting a network connectivity issue), while other technicians are not so capable. Likewise, certain service locations may have users who have special needs, such as language requirements, disabilities, or otherwise. Such special needs may in turn present challenges when assigning technicians to perform certain jobs and tasks.

Further, it is to be appreciated that the wide variety of technological jobs and other tasks that a service provider may face are further complicated by the simple fact that all technicians are not the same. Some technicians have proficiencies in certain technical fields, possess certain social traits, some are multi-lingual, or otherwise, while others do not. Likewise, some technicians, but not all, may be capable of performing certain physical tasks (such as lifting a heavy object or crawling through a narrow opening). Some technicians may be psychologically capable of performing tasks under certain situations (such as in disaster areas, at heights, tight spaces, or otherwise). Likewise, some technicians may simply prefer not to perform certain tasks, or may not be located within a desired distance of a service location.

Further, users of such services desire to know, within a reasonable time window, when a technician will arrive, how long completion of the job and/or task(s) will take, the name of the technician, and any other actions the user needs to perform to facilitate the providing of the services by the technician. Examples of such other user actions may include moving furniture, turning off of electrical power, having network and other passwords available, or otherwise.

Thus, it is commonly appreciated that a wide variety of physical, psychological, educational, demographic, technician preferences, location, user characteristics, and other variables (herein, each a "service parameter") may influence a given ability of a service provider to select, assign, monitor, provide an ETA, and manage the accomplishment of a job and/or task by one technician, let alone across a population of technicians. Presently, solutions to these and other needs are lacking. Accordingly, the various embodiments of devices, systems and processes for the present disclosure are provided to address the above and other logistical needs.

SUMMARY

The various embodiments of the present disclosure describe devices, systems, and processes for managing technician logistics. More specifically, at least one embodiment of the present disclosure provides devices, systems and processes for managing assignment of jobs and/or tasks to technicians based upon one or more skills and/or capabilities associated with each of a population of technicians as compared against one or more requirements associated with a given job and/or task. At least one embodiment of the present disclosure relates to devices, systems and processes for managing routing, providing an ETA, and other parameters associated with a performance of a given task by a selected technician, and as such parameters are communicated to one or more users of a service provider.

In accordance with at least one embodiment of the present disclosure, a process, for managing technician logistics may include executing, by a hardware processor associated with a service provider, at least one non-transient computer executable instruction for determining an estimated time of completion (ETC) for an assigned technician for a current task at a current service site. For at least one embodiment, the ETC may be determined based upon an average statistical time for task completion (ASTTC) for the current task. For at least one embodiment and based upon the ETC, an estimated time of arrival (ETA) for the assigned technician at a first service site may be determined. The process may further include communicating the ETA to a first user using a communications system communicatively coupling the hardware processor with a first user device. The first user may have requested completion of a first task at the first service site.

For at least one embodiment of the present disclosure the process, for managing technician logistics may include determining an ETC based upon a stress differential (S) and a task complexity coefficient (TCC). For at least one embodiment, the stress differential (S) may be determined as a difference between an expected stress level (SE) for the current task and a present stress level (SP) for the assigned technician. For at least one embodiment, the expected stress level (SE) may be empirically determined. For at least one embodiment, the present stress level (SP) may be determined based upon data provided by at least one technician monitor. The at least one technician monitor may be at least one of a biometric monitor, a posture monitor, a stress monitor, an activity monitor, and an environment monitor. For at least one embodiment, each of the expected stress level (SE) and the present stress level (SP) may fall within one of a low stress level, a normal stress level, a high stress level, and a critical stress level.

For at least one embodiment of the present disclosure the process, for managing technician logistics may include determining an ETC based upon a stress differential (S) and a task complexity coefficient (TCC), wherein the stress differential (S) is weighted by a technician specific weighting factor (Tn) for the assigned technician. For at least one embodiment, the technician specific weighting factor (Tn) may be based upon at least one technician rating. For at least one embodiment, a technician rating may be based upon at least one of a technician skill characteristic, a technician social characteristic, a technician environmental characteristic, and a technician preference.

For at least one embodiment of the present disclosure the process, for managing technician logistics may include determining an ETC based upon a stress differential (S) and a task complexity coefficient (TCC), wherein the task complexity coefficient (TCC) may be based upon at least one task categorization (TC). For at least one embodiment, the TCC may be determined based upon empirical results. For at least one embodiment, the TC may include a low category, a normal category, a high category and a critical category. For at least one embodiment, conditions under which a given task parameter falls into at least one of the low category, normal category, high category and critical category may be predetermined, or specified by a regulatory body.

In accordance with at least one embodiment of the present disclosure a process for managing technician logistics may include executing, by a hardware processor associated with a service provider, at least one non transient computer executable instruction for receiving a request, by a service provider, from a first user for a first job to be accomplished at a first service site. The computer executable instructions may further include identifying a first task to be performed for the first job, identifying a first technician available to perform the first task, designating the first technician as an assigned technician to the first job and the first task, and determining an estimated time of completion (ETC) for a current task. For at least one embodiment, the current task may be associated with a current job at a current service site.

In accordance with at least one embodiment of the present disclosure a process for managing technician logistics may include executing, by a hardware processor associated with a service provider, at least one non transient computer executable instruction for determining an estimated time of arrival (ETA) for the technician at the first service site. For at least one embodiment, the computer executable instructions may further include communicating the ETA to the first user, monitoring performance of the current task by the assigned technician, determining whether performance of the current task is on schedule, if not on schedule, determining whether a second technician is needed and available to perform the first task, if a second technician is needed and available, designating the second technician as the assigned technician, periodically communicating an updated ETA to the first user, and repeating the above operations until the current task is completed. The computer executable instructions may also include, upon completion of the current task, dispatching the assigned technician to the first job.

For at least one embodiment, a current task may be categorized by a task categorization (TC) and a task complexity coefficient (TCC) may be based on a given task categorization.

For at least one embodiment, a technician specific weighting factor (Tn) may be associated with a given technician, such as an assigned technician. The technician specific weighting factor (Tn) may be determined based upon at least one of technician rating. The at least one technician rating may be based upon at least one of a technician skill characteristic, a technician social characteristic, a technician environmental characteristic and a technician preference.

For at least one embodiment, an ETC may be determined based upon a TCC for the current task and a weighted value of a stress differential (S) for the current task.

For at least one embodiment, a stress differential (S) may be a non-zero, absolute value of a difference between an expected stress level (SE) and, for an assigned technician, a present stress value (SP).

For at least one embodiment, a hardware processor may be configured to execute non transient computer instructions for determining the present stress value (SP) based upon at least monitor reading from at least one of a biometric monitor, a posture monitor, a stress monitor, an activity monitor, and an environment monitor. The at least one monitor reading may be received from a technician device communicatively coupled to the hardware processor associated with the service provider.

In accordance with at least one embodiment of the present disclosure, a system for managing technician logistics may include a service provider system. The service provider system may include a hardware processor configured to execute, using the hardware processor, non-transient computer executable instructions. The system may further include a technician device for an assigned technician communicatively coupled to the service provider system. The technician device may be coupled to and receives monitored data from at least one of a biometric monitor, a posture monitor, a stress monitor, an activity monitor, and an environment monitor. The technician device may be further configured to communicate the monitored data to the service provider system. The system may further include a user device for a first user, communicatively coupled to the service provider system.

For at least one embodiment, the computer executable instructions, executed by a hardware processor, may include instructions for determining an estimated time of completion (ETC) for an assigned technician for a current task at a current service site. For at least one embodiment, the ETC may be determined based upon an average statistical time for task completion (ASTTC) for the current task.

For at least one embodiment and based upon an ETC, an estimated time of arrival (ETA) for the assigned technician at a first service site may be determined. The first service site may be associated with a first user. The computer executable instructions may include communicating the ETA to the first user device. Such communications may occur when the first user has requested completion of a first task at the first service site.

In accordance with at least one embodiment of the present disclosure, a system for managing technician logistics may include a service provider system having a hardware processor configured to determine an ETC based upon a stress differential (S) and a task complexity coefficient (TCC). For at least one embodiment, the stress differential (S) may be a difference between an expected stress level (SE) for a current task and a present stress level (SP) for an assigned technician to the current task. For at least one embodiment, the present stress level (SP) may be based upon monitored data received from a technician device.

For at least one embodiment, a system for managing technician logistics may include a hardware processor configured to execute non-transient computer instructions for determining whether an expected stress level (SE) and a present stress level (SP) fall within one of a low stress level, a normal stress level, a high stress level, and a critical stress level.

For at least one embodiment, a system for managing technician logistics may include a hardware processor configured to execute non-transient computer instructions for determining an ETC based upon a stress differential (S) that is weighted by a technician specific weighting factor (Tn) for an assigned technician. For at least one embodiment, the technician specific weighting factor (Tn) may be based upon at least one technician rating. The at least one technician rating may be based upon at least one of a technician skill characteristic, a technician social characteristic, a technician environmental characteristic, and a technician preference.

For at least one embodiment, a system for managing technician logistics may include a hardware processor configured to execute non-transient computer instructions for determining an ETC based upon a task complexity coefficient (TCC) that is further based upon at least one task categorization (TC). The TC may include at least two categories. Conditions under which a given task parameter falls into at least one of at least two categories may be specified by a regulatory body.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1:
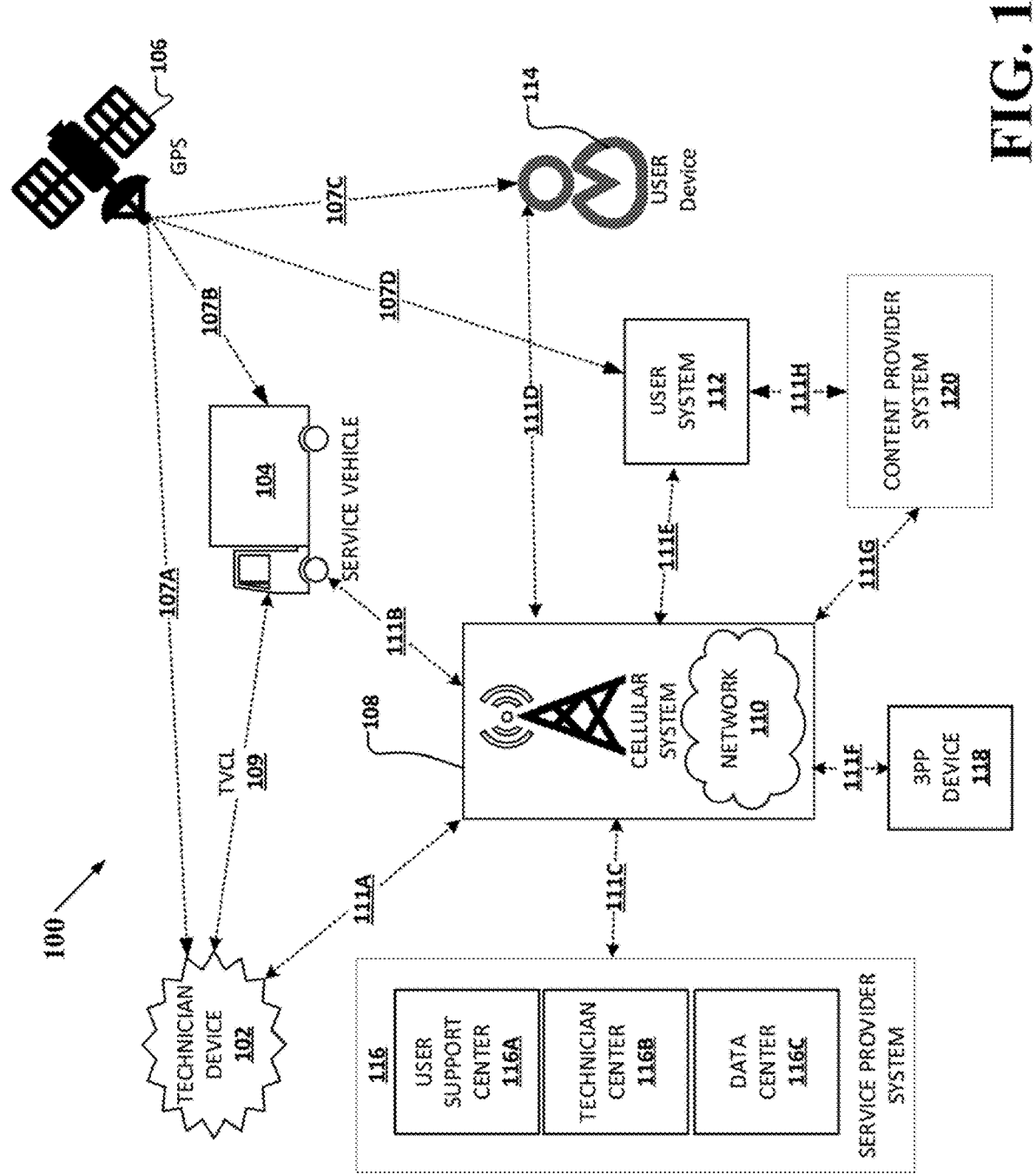
FIG. 1 is a schematic representation of a system for use in managing technician logistics and in accordance with at least one embodiment of the present disclosure.

The various embodiments described herein are directed to devices, systems, and processes for managing technician logistics. More specifically, at least one embodiment of the present disclosure provides devices, systems and processes for managing assignment of job and/or tasks to technicians based upon one or more skills and/or capabilities associated with each of a population of technicians as compared against one or more requirements associated with a given job and/or task. At least one embodiment of the present disclosure relate to devices, systems and processes for managing routing, providing an ETA, and other parameters associated with a performance of a given job and/or task by a selected technician, and as such parameters are communicated to one or more users by a given service provider.

As described herein for at least one embodiment of the present disclosure, a "service provider" is defined as any entity providing a "service" at a "service site" specified by a "user" (as such bold faced terms are further defined herein).

Non-limiting examples of a service site include a user's home, place of business, location of a vehicle (e.g., in the case of roadside assistance), or any other physical location. A service site is identifiable by one or more of a navigational coordinate system, such as a latitude and a longitude, an address, a time, a direction and a distance marking, or otherwise.

A service site includes one or more user systems. As used herein, a "user system" is any single or combination of devices, systems, components, elements, or otherwise which a user desires for a technician to install, repair, replace, modify, upgrade, troubleshoot, or take any other agreed upon (then or at a later time) action. A user system may be located at a single service site and/or distributed over multiple service sites. For example, a user system that includes use of content place shifting from a source location (such as a user's home) to a remote location (such as a remote office room in another city) may involve technical issues arising at one or more of the source location and/or the remote location. Accordingly, a job and one or more tasks associated therewith might entail a first task of dispatching a first technician to the home and a second task of dispatching a second technician to the remote office.

Non-limiting examples of services include telephony, Internet, security, cable and satellite TV, electrical, plumbing, heating, ventilation and air conditioning, home maintenance, automotive, lawn and garden, snow removal, trash and refuse, and others. A service may include one or more "tasks." As used herein, a "task" is a clearly defined, repeatable piece of work, involving one or more technical skills, with respect to which an estimable time to complete (ETC) may be calculable based upon past completions of the given task by one or more skilled technicians at prior service sites. As used herein, a task can be contrasted with a "job" which may involve a collection of tasks and/or one or more unique/one-of-a-kind activities that are not commonly subject to repetition.

A "user" is any person or legal entity that desires to receives one or more services from one or more service providers.

A "technician" is a person that has acquired specialized knowledge or skills with respect to at least one technical subject or a technical occupation. Non-limiting examples of technicians includes electricians, plumbers, computer technicians, network installers, cable and TV installers, and the like. A technician can be distinguished from a user in that the technician has received formal training and/or on-the-job experience and, in many cases, may have received certification and/or licensing by an independent public or private body regarding a given technical subject or a technical occupation.

The various embodiments of the present disclosure provide devices, systems and processes for managing technician logistics. In accordance with at least one embodiment, numerous service parameters may be analyzed to provide a desired solution in the providing of services to a given service site and to numerous service sites. For at least one embodiment, service parameters may include one or more "technician parameters", "task parameters", "user parameters", "service site parameters", and other parameters (as such terms are further defined herein). For at least one embodiment of the present disclosure and based on one or more of these parameters and historical estimates associated therewith, technician logistics may be managed.

For at least one embodiment, a "technician parameter" is a parameter that identifies a skill, capability, preference (for/against), characteristic, biological/health aspect, or other element regarding a technician. Non-limiting examples of technician parameters include biological/health characteristics, such as strength, endurance, height, weight, age, coordination, and the like. Technician parameters may include psychological factors including, but not limited to, fears (example a fear of heights or tight spaces), phobias, willingness to learn, and others. Technician parameters may include skill based factors including, but not limited to, years of experience in a given technical field, certifications, licenses, training, competencies and others. Technician parameters may include sociological factors including, but not limited to, language fluencies, social awareness, motivational aptitudes, empathy, organizational aptitudes, leadership aptitudes and others. Technician parameters may be categorized and stored in one or more databases.

For at least one embodiment, a "task parameter" is a parameter that identifies a skill, level of competency, ability, requirement, tool, part, component, characteristic or other element of a given task. A task parameter may identify a job with respect to which the task is an element of the job or otherwise. For example, a job that involves connecting a main electrical circuit breaker panel with a line power source may specify a task level of competency for the technician of being a licensed electrician to so connect. Installation, but not electrical connection, of the circuit breaker panel may be a task in the overall job of circuit breaker install, and have a lesser technical requirement. Similarly, a job that involves troubleshooting a computer mainframe at a service site may specify that certain tasks require a technician to be certified in LINUX, UNIX, WINDOWS, or other operating systems. Similarly, a job that involves routing cables through a structure may include an in-attic task that specifies that the technician does not exceed a certain weight limit, is not allergic to dust, is to be performed in the early morning hours (before the attic becomes too hot), or otherwise, while a not in-attic task associated with that job may have different characteristics. It is to be appreciated that task parameters may be categorized and stored in one or more databases. Such categories may include one or more job categories, as a given task may apply to one or more jobs.

For at least one embodiment, a "user parameter" is a parameter that identifies a characteristic of a given user. Non-limiting examples of user parameters may include ethnicity, religion, languages spoken, time/work constraints, whether pets are present, whether children are present, preferences for time of service, and others. For example, a user parameter may specify that a given user works nights—thus services provided mid-day are to be avoided. Similarly, a user parameter may specify that a given user only speaks a given language, thus, informing the service provider that a dispatching of a technician not fluent in such given language should be avoided. User parameters may be categorized and stored in one or more databases.

For at least one embodiment, a "service site parameter" is a parameter that identifies a characteristic of a service site. Non-limiting examples of service site parameters include geographic characteristics, such as address, elevation, time zone and the like. Other non-limiting examples of service site parameters may include technical characteristics, such as types of electronic (or other) devices utilized, known configurations of such devices, and the like. Other non-limiting examples of service site parameters may include past service history, past jobs and/or tasks, prior technician(s) dispatched, and the like. It is to be appreciated that service site parameters may be categorized and stored in one or more databases.

For at least one embodiment, technician parameters, task parameters, user parameters, and service site parameters may include, at least in part, one or more substantially similar categories. Such substantially similar categories may be utilized by a service provider in determining which technician to dispatch to a given service site to perform a job and/or one or more tasks associated with such job.

As used herein, "technician logistics" broadly refers to the management of details of a service to be provided by a service provider, via one or more technicians, with respect to a given user, at a given service site, for a job that includes one or more tasks. More specifically, technician logistics also refers to the assigning (and procuring as needed) of material and technicians needed to perform the job and the one or more tasks thereof. Technician logistics also refers to the monitoring of task performance by at least one technician, determinations of ETC, routing of technicians to service sites, providing of ETAs for a given technician to a service site, and the like. Technician logistics also refers to those efforts taken by a service provider to seek to determine and communicate, to a given user, information regarding the technicians assigned to accomplish a job and/or one or more tasks thereof, a service window during which the job and/or one or more tasks will be performed, and other information.

In FIG. 1, a system 100 for managing technician logistics is shown. The system may include various elements including a technician device 102, a service vehicle 104, a GPS satellite 106 or other location system, a communications system 108, a user system 112, a user device 114, a service provider system 116, a third party provider (3PP) system 118, a content provider system 120, and various communications links therebetween. Each of these system elements are further described below.

Technician Device 102

Figure 2:
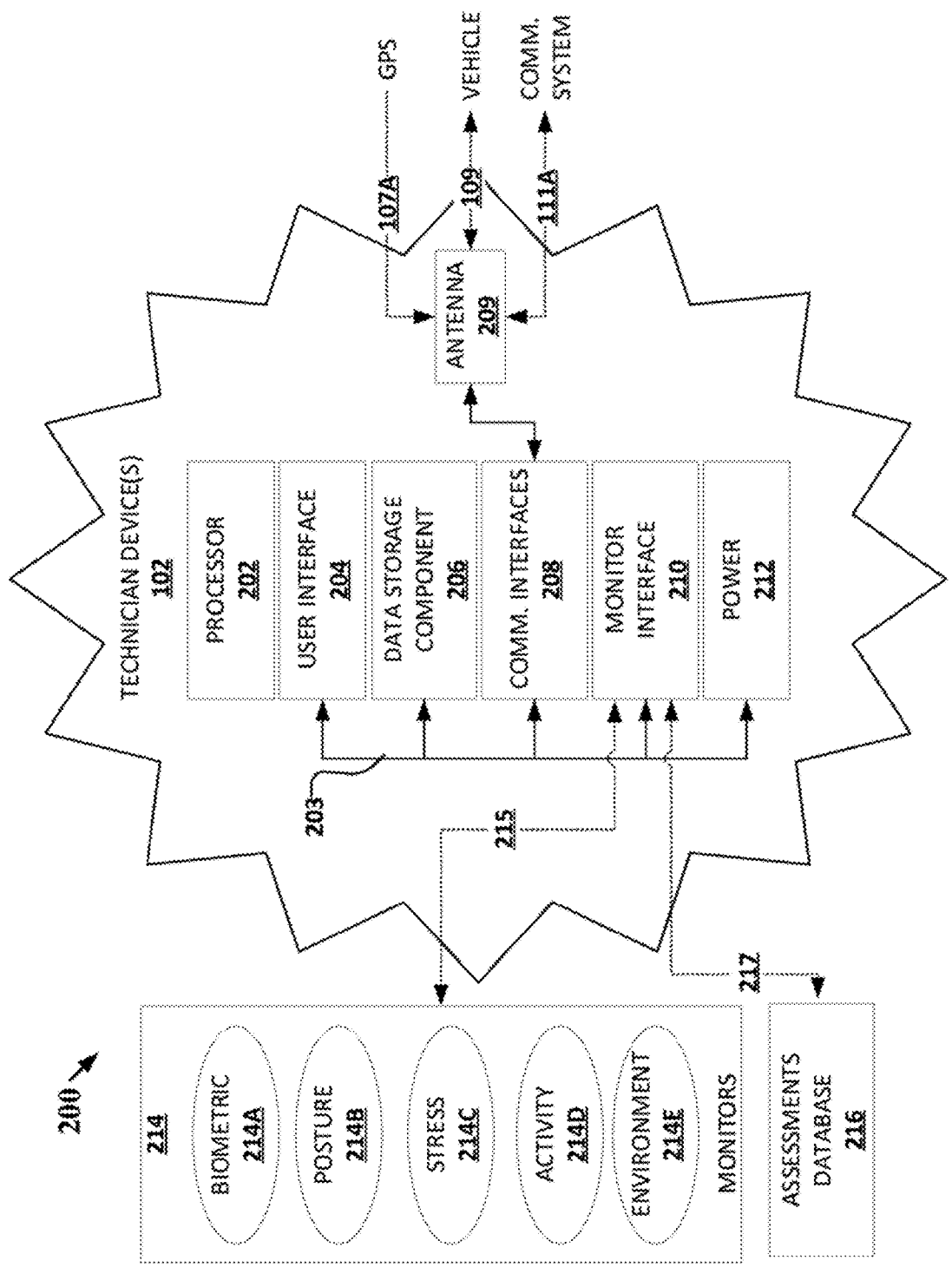
FIG. 2 is a schematic representation of a technician device and one or more monitors configured for use therewith in managing technician logistics and in accordance with at least one embodiment of the present disclosure.

The system 100 may include a technician device 102. The technician device 102 may be any form of portable computing and/or communications device configured to process data and communicate such data and/or other information by and between a given technician and one or more other devices. Non-limiting examples of a technician device 102 include smart-phones, tablets, laptop computers, and the like. Any currently available or later arising personal computing and/or communications device may be utilized as a technician device 102. One embodiment of a technician device 102 is illustrated in FIG. 2 and is further described below.

Service Vehicle 104

The system 100 may include a service vehicle 104. The service vehicle 104 is commonly provided for many implementations of an embodiment of the present disclosure, but may not be used in certain settings, such as in dense urban settings where a technician may travel by foot, bicycle, mass-transit or otherwise between two or more service sites, in remote geographic settings, where travel by vehicle is impracticable, or otherwise. When used, the service vehicle 104 may provide a movable warehouse or other repository for one or more tools, supplies, parts, equipment, or the like that a technician may use to perform one or more tasks. For example, a technician providing plumbing services may use a service vehicle 104 providing various pipes, fitting, plumbing tools, and the like. In contrast, a technician providing electrical service may use a service vehicle 104 providing electrical connectors, fixtures, electrical tools, and the like. Further, it is to be appreciated that one or more of the various embodiments of the present disclosure may provide a technician, a service provider and/or others with real-time information on whether a given technician, at a given time, is equipped to perform a given task based upon one or more of the tools, supplies, equipment and the like readily available to the technician via a given service vehicle, or otherwise. When not so equipped, the routing of such needed supplies may be accomplished, when possible, automatically, semi-automatically, or otherwise.

At least one embodiment of the present disclosure may facilitate the managing of technician logistics with respect to one or more tasks, at least in part, based upon a service vehicle 104 associated with such technician and how such service vehicle 104 is or is not then equipped. Further, it is to be appreciated that one or more embodiments of the present disclosure may facilitate the managing of technician logistics based upon one or more supply or re-supply factors for a given technician and/or a service vehicle 104 associated therewith. For example, a determination of whether a technician and/or their service vehicle 104 (if any) is within range of a supply source may be considered when managing technician logistics. It is to be appreciated that supplying/re-supplying of a technician and/or a service vehicle 104 associated therewith may occur using any currently available and/or later arising delivery technologies, non-limiting examples of which include drones, delivery services, centralized distribution hubs, couriers, and the like.

As shown in FIG. 1, the technician device 102 (and thereby the technician) may be communicatively coupled to the service vehicle 104 using a technician to vehicle communication link (a "TVCL") 109. The TVCL 109 may utilize any currently available and/or later arising communications technologies. For at least one embodiment, the TVCL 109 may use a short-range communications technology, such as BLUETOOTH. For at least one embodiment, the TVCL 109 may additionally and/or alternatively use a mid-range communications technology, such as a cellular or mobile phone based service. For at least one embodiment, a longer range communications technology such as narrowband IoT or the like may be used. Such longer range communications technology may be useful, for example, when a service vehicle 104 is located at a distance of forty (40) meters or more from a service site and cellular or other communications services are not readily available.

For at least one embodiment, the technician device 102 may be configured to maintain a computerized inventory of then available tools, supplies and/or equipment provided by the service vehicle 104. Such computerized inventory may be accessible by the technician device 102 directly, such as by periodic download, or indirectly, such as by using the TVCL 109.

GPS System 106

For at least one embodiment, one or more of the technician device 102 and/or the service vehicle 104 may be configured to receive one or more location signals 107 for use in determining a present location thereof. Any type of location signal 107 or combinations thereof may be used including, but not limited to, those emitted by a Global Positioning System (GPS) satellites 106 and otherwise. As shown in FIG. 1, a first set of location signals 107A may be communicated by GPS satellites 106 to the technician device 102. Similarly, a second set of location signals 107B may be communicated by GPS satellites to the service vehicle 104. The location signals may be used to map, monitor and assess paths traveled by the technician and/or the service vehicle. For example, a repetitive travel by a technician to a service vehicle, during a job, may be used by a service provider to determine inefficiencies and/or areas for improvement in how a given technician approaches a job and one or more tasks associated therewith. Such information may be used in managing technician logistics including, but not limited to, calculating ETAs, ETCs, improving job processes, and the like.

Communications System 108

For at least one embodiment, one or more of the technician device 102 and/or the service vehicle 104 may be communicatively coupled, directly and/or indirectly, to a communications system 108. The communications system 108 may include use of any currently available and/or later arising communications technologies, and combinations thereof.

For at least one embodiment, the technician device 102 and/or service vehicle 104 may be communicatively coupled to the service provider system 116 and otherwise using a wireless communications technology, such as a 3G/4G/5G cellular connection, via Wi-Fi, and otherwise. The technician device 102 and/or service vehicle 104 may be communicatively coupled to the service provider system 116 and otherwise using a wireless mesh communications network. The technician device 102 and/or service vehicle 104 may be communicatively coupled to the service provider system 116 and otherwise using at least one of a wired system, a wireless system, or a combination thereof. The technician device 102 and/or service vehicle 104 may be directly communicatively coupled to the service provider system 116. The technician device 102 may be communicatively coupled to the service provider system 116 via the service vehicle 104 and vice versa.

The communications system 108 may include any desired data network and/or combinations thereof, such as the Internet, a local area network, a wide area network, a dedicated network, an undedicated network, private network, a public network, or otherwise (herein, a "network" 110). Communications between the technician device 102 and the service provider system 116 may be, at any given time, unidirectional, bi-directional, or otherwise. One or more of the technician device 102 and/or service vehicle 104 may be communicatively coupled to a local area network (not shown), for example, by using Bluetooth Low Energy technology. The local area network may be connected, via the Internet or otherwise, to a service provider system 116 (as further described below) or otherwise.

For at least one embodiment, one or more communications links 111 may arise between a technician device 102, a service vehicle 104, a service provider system 116, a user 114, a user system 112, a network 110, or otherwise. Any of such communications links, at any given time, may be non-transient and/or transient. As used herein for purposes of clarity only, a communications link between a technician device 102 and a communications system 108 is identified as a "technician link" 111A. A communications link between a service vehicle 104 and a communications system 108 is identified as a "vehicle link" 111B. A communications link between a service provider system 116 and a communications system 108 is identified as a "service provider link" 111C. A communications link between a user device 114 and a communications system 108 is identified as a "user link" 111D. A communications link between a user system 112 (as described below) and a communications system 108 is identified as a "user system link" 111E. A communications link between a third party provider (3PP) device 118 (as defined below) and a communications system 108 is identified as a "3PP link" 111F. A communications link between a content provider system 120 (as described below) and a communications system 108 is identified as a "first content link" 111G and a communications link between a content provider system 120 and a user system 112 is identified as a "second content link" 111H.

User System 112

The system 100 may include a user system 112. As discussed above, the user system 112 may be located at a single service site and/or distributed over multiple service sites. The user system 112 may involve use of any device, system or technology with respect to which a technician is to be dispatched to perform one or more jobs and/or tasks. It is to be appreciated that actual tasks performed and/or needing to be performed may be determined after a technician arrives at a service site. As shown in FIG. 1 and for at least one embodiment, the user system 112 may be configured to receive location signals, from any source, such as third location signals 107C provided by a GPS system 106. For other embodiments, the user system may not be so configured. Further, the user system 112 may not be communicatively coupled to any other device, as may arise for a given service site.

User Device 114

The system 100 may include a user device 114. The user device 114 may be any device by which a user may communicate with a service provider in furtherance of the providing of one or more services by such service provider. The user device 114 may be any form of portable computing and/or communications device. Non-limiting examples of a user device 114 include smart-phones, tablets, laptop computers, home phones, and the like. Any currently available or later arising personal computing and/or communications device may be utilized as a user device 114. As shown in FIG. 1 and for at least one embodiment, the user device 114 may be configured to receive location signals, from any source, such as fourth location signals 107D provided by a GPS system 106.

Service Provider System 116

Figure 3:
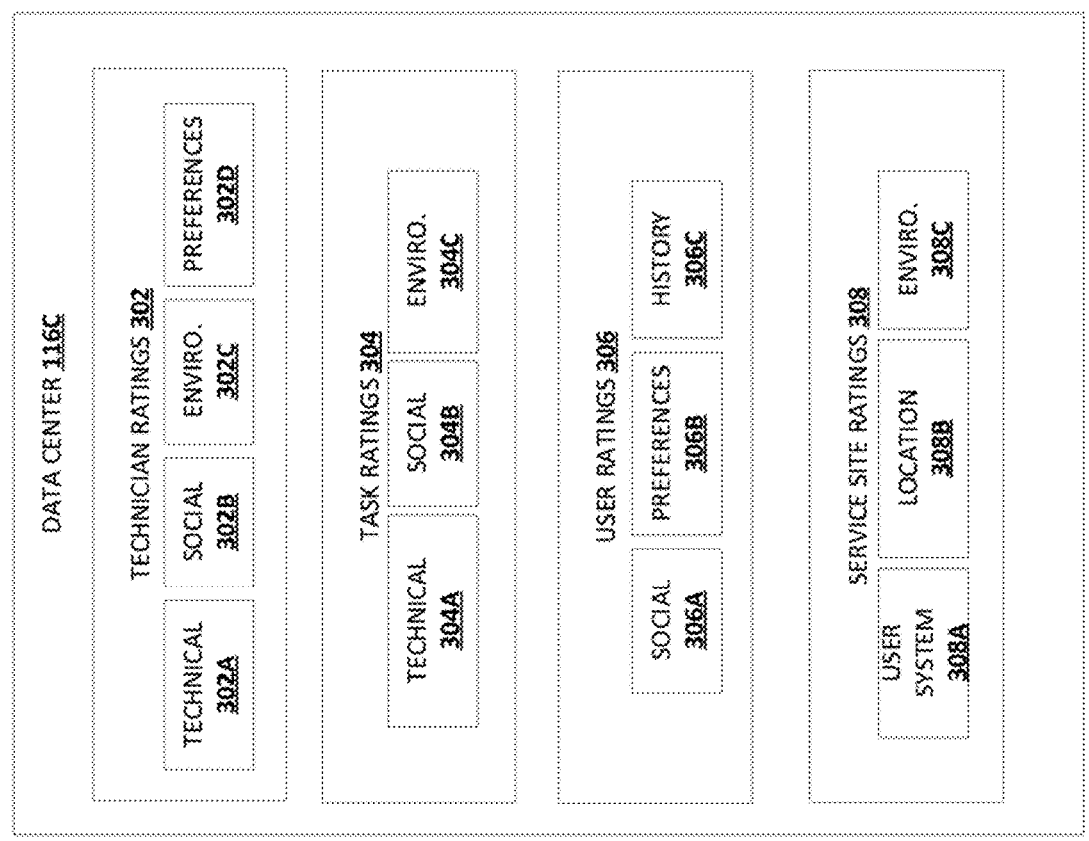
FIG. 3 is a schematic representation of one or more databases configured for use in managing technician logistics and in accordance with at least one embodiment of the present disclosure.

The system 100 may include a service provider system 116. For at least one embodiment, the service provider system 116 may include use of one or more "centers" including, but not limited to, a user support center 116A, a technician center 116B, and a data center 116c. The centers may be configured to provide one or more computer executed managers and/or computer databases. Illustrative examples of such databases are shown in FIG. 3 and are further described below. As used herein, a "manager" includes a hardware processor configured to execute one or more non-transient computer executable instructions, upon one or more data elements, to provide a desired function or set of functions.

For at least one embodiment, each such manager may be facilitated by any general purpose computing device (or collection thereof) consisting of hardware and non-transient computer executable instructions configured to provide one or more of the features and/or functions described herein. For at least one embodiment, such computing devices may include one or more hardware processors, such as 32-bit and 64-bit central processing units, multi-core ARM based processors, microprocessors, microcontrollers, and otherwise (hereafter, "computer processor(s)" and/or "processor(s)"). The non-transient computer executable instructions may include instructions for executing one or more applications, engines, and/or processes configured to perform computer executable operations (hereafter, "computer instructions"). Such hardware and software technologies may arise in any desired computing configuration including, but not limited to, those local, remote, distributed, blade, virtual, or other configurations and/or systems configured for use in support of the one or more embodiments of the present disclosure.

The centers, managers and databases may also include use of one or more transient and/or non-transient "data storage components." Such data storage components include hardware and non-transient computer instructions configured to facilitate storage of computer accessible data. Such data storage, for any given element of data, may occur for any desired time period, including indefinitely. Any known or later arising data storage hardware and computer instructions may be used with one or more embodiments of the present disclosure.

One or more of the user support center 116A, technician center 116B and data center 116C may be co-located with another center or distributed—as desired for any given implementation of an embodiment of the present disclosure. Each of these centers may include use of computer processors, data storage devices and the like. One or more of such centers may include use of human operators, automated systems (including, but not limited to, automated voice response systems), semi-automated systems, machine learning system, artificial intelligence systems, augmented intelligence systems, and the like.

User Support Center 116A

More specifically and for at least one embodiment of the present disclosure, the user support center 116A may be configured for interfacing with the user by communicating humanly perceptible information by and between the hardware processors, as described above, a user device 114 and, as output or received thereby, the user. For example, a user desiring to schedule a technician for a given job may select to do so using voice, text, web, or other applications or interfaces using, for example, a user device 114. The user support center 116A may be configured to receive and process such information in scheduling a job—desirably at a user agreed upon day and time, or window thereof. Further, the user support center 116A may be configured to request, receive and process one or more user parameters, as defined above. Such user parameters may be suitably stored, including in secure format, as desired in the data center 116C, on a user device 114, or otherwise. The user support center 116A may be further configured to provide one or more of such user parameters to the technician center 116B for use thereby in managing technician logistics. The user support center 116A may be configured to request information from the technician center 116B and share, in whole or in part, such information with a user. For example, a current location of a technician may be shared with a user.

The user support center 116A may be configured to communicate status, update, estimates, request user feedback and other information by and between a user and/or a user device 114. Such information may include providing of ETA, ETC, technician information, and other job/task related information. For at least one embodiment, the user support center 116A may be configured to provide real-time routing information to a given user for a given technician to a given service site. Such routing information may be presented in any desired format such as on a virtual map or otherwise.

Technician Center 116B

The technician center 116B may be configured for managing technician logistics by providing multiple technician related managers. For example, the technician center 116B may include a schedule manager by which jobs and tasks associated therewith are scheduled. Such job and tasks may be presented for human perception in any desired format, such as on a calendar, in a list, or otherwise. For at least one embodiment, such job/task scheduling may occur on a dynamic basis or otherwise. For at least one embodiment, the technician center 116B may include a task manager. The task manager may be configured to identify, update, revise, add, delete or otherwise interface with data pertaining to one or more task parameters. For example, a task relating to installing a video cable may be updated from time to time to reflect a different type of cable being needed, such as when cabling requirements change with increases in bandwidth and increases in resolution of video signals. For at least one embodiment, the technician center 116B may include a mapping manager. The mapping manager may be configured to provide a visual representation of job and tasks as distributed on a map, in a table, or otherwise. Additionally or alternatively, the mapping manager may be configured to provide routing directions to a technician from a current location to a next service site. For at least one embodiment, such routing directions may be provided in any desired format and for presentation using any desired device including, but not limited to, on smart watches, smart phones, heads-up-displays, augmented reality displays, in-vehicle navigation systems, in an humanly perceptible audible format, as instructions to self-driving and/or assisted driving vehicles, or otherwise. For at least one embodiment routing directions may include a recommended route and, when available, one or more optional routes. Such recommended and/or optional routes may be updated on any basis, such as periodically, real-time, or otherwise. Further, routing directions may include dynamically rerouting of technicians based upon presently arising jobs. For example, a plumber being routed to a non-emergency clogged drain job at a first service site may be dynamically rerouted to a second service site involving a ruptured pipe.

The technician center 116B may be configured to communicate information generated by its various managers to the relevant technician(s) and with respect to one or more assigned job and/or tasks for such technicians. The technician center 116B may also be configured to receive data and information from technicians. Such data and/or information may include, for example and not by limitation, request for certain supplies needed to perform a given task, requests for additional assistance virtually or in-person, status updates, biometric status updates, and the like.

Data Center 116C

The data center 116C may be configured to execute one or more data managers. Such data managers may perform one or more computer executed operations that are useful in interpreting, analyzing, correlating and otherwise receiving storing and/or processing one or more of task parameters, technician parameters, user parameters, service site parameters and other parameters in furtherance of managing technician logistics. One non-limiting example of a data manager configured for use in identifying an ETA for a given task is discussed further below.

Third Party Provider Device(s) 118

As further shown in FIG. 1, the system 100 may include one or more third party provider ("3PP") devices 118. It is to be appreciated that a service provider may provide services using its own employees, under sub-contract or other arrangement with another person or legal entity, or otherwise. For example, a provider of home maintenance services may provide services using one or more other entities such as independently operated electricians, carpenters, plumbers, data centers, or otherwise. As used herein, such other entities are identified as each being a "$3^{rd}$ party provider" (or "3PP"). The system 100 may be configured to facilitate communications by and between one or more of the service provider system 116, a technician device 102, a service vehicle 104, a user system 112, a user device 114, and a 3PP device 118. Any desired instance, set or combination of information communicable by and between the service provider system 116 and one or more of a technician device 102 and a user device 114 or a user system 112 may be communicable to a 3PP device 118.

The 3PP device 118 may be any device by which a 3PP may communicate with a service provider, a technician, and/or a user in furtherance of the providing of one or more services by such service provider. The 3PP device 118 may be any form of portable computing and/or communications device. Non-limiting examples of a 3PP device 118 include smart-phones, tablets, laptop computers, home phones, and the like. Any currently available or later arising personal computing and/or communications device may be utilized as a 3PP device 118. While not shown in FIG. 1, the 3PP device 118 may also be configured to receive location signals, from any source, such as fifth location signals (not shown) provided by the GPS system 106.

Content Provider System 120

The system 100 may include one or more content provider systems 120. A content provider system 120 may be configured to provide content to a user system in any desired form or format. Non-limiting examples of such content may include web pages, e-books, music, videos, pictures, applications, games, augmented reality information, virtual reality information, and otherwise. The content may be provided to the user system 112 using an indirect link, such as a $1^{st}$ content link 111G established between the content provider system 120 and the communications system 108. The indirect link may include use of a network 110, such as the Internet or otherwise. The content may be provided to the user system 112 using a direct link, such as a satellite television link to a satellite television system, such as those provided by DIRECTV and DISH NETWORK. The content provider system 120 may also be configured to receive content from a user system 112. For example, home security video feeds, such as those provided by ADP, RING, NEST and others may be communicated, directly and/or indirectly, from a user system 112 to a content provider system 120.

It is to be appreciated that a job and one or more tasks associated therewith may arise with respect to any user system 112 and/or with respect to interactions of such user system(s) with respect to one or more content provider system(s) 120 or otherwise. For example, an automated home may include flood detection warning systems that may involve plumbing tasks, e.g., the detection of a flood situation, as well as communication/networking tasks, e.g., the reporting of the flood situation to a home monitoring service. The various embodiments of the present disclosure are provided to address such multi-factor job/task scenarios in managing technician logistics.

Technician Device System 200

In FIG. 2, one embodiment of a technician device system 200 is shown. It is to be appreciated that one or more elements of such a technician device system 200 may be provided local to the device itself or remotely. Further, the technician device system 200 may be provided in any desired form factor, such as an integrated device, a collection of communicatively coupled devices, or otherwise.

Technician Device Processor 202

The technician device system 200 may include a technician device 102 that further includes a processor 202, as defined above. The processor 202 may be communicatively coupled to other technician device elements using a central bus 203 or other configuration.

User Interface(s) 204

The technician device 102 may include one or more user interfaces 204. Any currently known or later arising user to device interfaces may be used. Non-limiting examples of such user interfaces 204 include audio interfaces (such as, microphones, speakers, earbuds, headphones, speech translators, text to speech and speech to text translators, voice commands, and the like), visual interfaces (such as display screens, projectors, display glasses, augmented reality devices, virtual reality devices, cameras (in any desired wavelength), and the like), touch or tactile interfaces (such as, joysticks, mice, touchpads, touch screens, gesture motions, vibrations, and the like), brain scanning devices, and others. The user interface 204 may be configured to provide any desired information to a technician and/or receive information from a technician in furtherance of accomplishing a job and/or one or more tasks. One or more of the user interface elements may be communicatively coupled to the technician device 102 using wireless communication signals such as BLUETOOTH, NFC, ANT+, and otherwise.

Data Storage Components 206

The technician device 102 may include one or more data storage components 206, as defined above.

Communications Interfaces 208

The technician device 102 may include one or more communications interfaces 208. The communication interfaces 208 may provide for wired and/or wireless communications between a technician device 102 and another system 100 element. For example, a technician device 102 when located within a service vehicle 104 may be positioned into a dock, cradle or otherwise so as to provide a wired connection between the technician device 102 and the service vehicle 104. When outside the service vehicle 104, a wireless connection may be provided, such as the TVCL 109 described above. An antenna 209 may be used to facilitate wireless communications. The antenna 209 may include any known or later arising technologies. As shown, the antenna 209 may facilitate reception of the first location signal 107A, such as from GPS satellites 106, the TVCL 109, the technician link 111A, and otherwise.

Monitor Interface 210

The technician device 102 may include a monitor interface 210. The monitor interface 210 may provide one or more engines which facilitate use of one or more monitors 214. The monitor interface 210 may use capabilities of one or more of the processor 202, user interface 204, data storage component 206 and communications interfaces 208 to facilitate use of one or more monitors 214. For at least one embodiment, a monitor link 215 may communicatively couple a technician device 102 with each of one or more monitors 214. As shown, one or more of such monitors may be provided external to the technician device 102. However, it is to be appreciated, that one or more of such monitors 214 may be provided as integrated with a technician device 102 itself. Further, one or more of the monitors may be combined into a single device or otherwise.

Power Component 212

The technician device 102 may include a power component 212. Any desired power component may be used including, but not limited to, batteries, rechargeable batteries, inductive sources, inductive transmitters, line power, solar power, or otherwise. The power component 212 may be configured to provide electrical energy to technician device 102 elements, monitors 214, or otherwise.

Monitors 214

The technician device system 200 includes one or more monitors 214. Non-limiting examples of such monitors 214 may include one or more biometric monitors 214A, posture/position/movement monitors 214B (herein, each a "posture monitor"), stress and other psychological monitors 214C (herein, each a "stress monitor"), activity monitors 214D, environmental monitors 214E, and other monitors (not shown). It is to be appreciated that one or more of such monitors may be combined with, provided in, provided separately, communicatively coupled to, or otherwise accessible by the technician device 102. Any currently known and/or later arising monitors may be used. For at least one embodiment, SECURATRAC monitors may be used. For at least one embodiment, one or more of the following monitors may be used: a Healbe GoBe2™ smart band, a GSMIN WR 11™ smart band, a Xiaomi Mi™ smart band, or the like.

Biometric Monitors 214A

More specifically, the monitors 214 may include use of one or more biometric monitors 214A. Non-limiting examples of biometric monitors 214A include monitors for heart rate, respiration rate, cardiac rhythm, blood pressure, skin temperature, and the like. Biometric monitors 214A may be configured to provide to the technician device 102 and, as desired for any given embodiment, information regarding a current status, trend, or other data regarding a technician's biometric responses to a given task, a given environment, or otherwise. For example, a first technician performing a task in a given temperature environment may experience a given reaction to the environment. Such reaction may diminish that technician's performance quicker than another technician operating under substantially similar conditions. Such biometric information may be useful in managing technician logistics such as estimating, updating and determining an ETC, ETA, or otherwise.

Posture Monitors 214B

The monitors 214 may include one or more posture monitors 214B. Posture monitors 214B may be used to monitor, report and provide information regarding one or more positions, postures, movements or the like that a technician uses when performing a given task. For example, posture monitors 214B may be useful in identifying whether a given technician is using a desired (or other proper) form when lifting an object. Such information may be useful in managing technician logistics, such as keeping the technician in the field longer by preventing, alerting, or otherwise providing relevant position information to the technician themselves or others. For at least one embodiment, an UPRIGHT posture monitor, provided by Upright Technologies, LTD of Tel Aviv Israel, may be used.

Stress Monitors 214C

The monitors 214 may include one or more stress monitors 214C. Stress monitors 214C may be configured to monitor a technician's current stress level as indicated by one or more biometric factors, speech rate, speech volume, body gesture, brain wave, or other indicators. For at least one embodiment, a SPIRE STONE provided by Spire Health, a THYNC RELAX PRO provided by Thync Global Inc., or other stress monitor may be used.

Activity Monitors 214D

The monitors 214 may include one or more activity monitors 214D. Non-limiting examples of activity monitors 214D include FITBIT devise, GARMIN fitness watches, SAMSUNG GALAXY watches, APPLE watches, and the like.

Environmental Monitors 214E

The monitors may include one or more environmental monitors 214E. Non-limiting examples of environmental monitors 214E include temperature, wind, humidity, solar exposure, sound/noise, fumes/gasses, rain/moisture/chemical, electrical shock, radiation, and others. It is to be appreciated that desired monitors may vary by given job, task, technician, service provider, user system, service site, and otherwise.

For at least one embodiment of the present disclosure, the monitor interface 210 may be coupled, via an assessments link 217, to an assessments database 216. The assessments database 216 may be provided by the service provider, a 3PP, or otherwise. The assessments database 216 may include results from one or more technical, biometric, psychological, social, or other tests. For example, the WONDERLIC test may be used to assess a technician's cognitive abilities. Personality tests, such as the MYERS-BRIGG Type Indicator test, emotional intelligence, language proficiency, performance tests, and the like may be used. Such testing may be used in managing technician logistics.

More specifically, data provided by one or more monitors 214 may be used to determine one or more "technician skill characteristics." A technician skill characteristic may include use of one or more of the monitors shown in List 1 below. Technician skill characteristics may be determined based upon monitoring of a given technician in the performance of one or more tasks. Such task performance monitoring may occur over any given time period, such as over an initial six (6) month period for a new hire, and periodically thereafter, during on-the-job performance, performance testing, in different environments (such as those provided during winter versus summer) and otherwise. It is to be appreciated that a given technician skill characteristic may evolve, over time, based upon task repetition, learning, training, and the like.

As shown in List 2 below, one or more technician social characteristics may also be determined. A technician social characteristic may be determined using, for example, stress monitors 214C, assessment results, feedback provided by a supervisor, co-workers, users, and others, and other information. A technician social characteristic generally identifies how a given technician is likely to respond under certain conditions. Factors that may be used in providing a technician social characteristic may include, but are not limited to, those identified in List 2.

Further, one or more technician environmental characteristics may be assessed for a given technician. For example, a technician environmental characteristic may indicate that a given technician is likely to sweat profusely in humid environments, requires frequent hand warming in cold climates, or otherwise.

Further, one or more preferences for a technician may be used, as further described below.

| List 1 |
| --- |
| TECHNICIAN SKILL CHARACTERISTIC |
| Biometrics |
| Posture |
| Activity |

| List 2 |
| --- |
| TECHNICIAN SOCIAL CHARACTERISTIC |
| Conflict Mgmt. |
| Listening |
| Leadership/Delegation |
| Planning |
| Mentoring |
| Communication |
| Team Building |
| Decision Making |
| Compassion/empathy |
| Persuasion |
| Intellectual Endurance |
| Motivational |

Technician skill characteristics, technician social characteristics, technician environmental characteristics, and technician preferences may be used in one or more models, artificial intelligence processes, machine learning processes, or the like to determine one or more "technician ratings" useful in managing technician logistics, such as an ETA.

Further, each task may be assigned a corresponding rating of skill characteristics, social characteristics, and environmental characteristics. Such characteristics may collectively form a "task rating." A task rating may include one or more characteristics including those provided in List 1, List 2, and otherwise. It is to be appreciated that task ratings, and characteristics associated therewith may vary based on task. Task ratings may also be influenced by service site and/or user related characteristics. It is to be appreciated that information regarding service sites and/or user related characteristics may often be less robust than is information regarding characteristics for a given technician.

As shown in FIG. 3, the data center 116C may be configured to include one or more databases used to store technician ratings 302, task ratings 304, user ratings 306, and/or service site ratings 308. As discussed above, technician ratings may be based on technical 302A, social 302B, and environmental (enviro.) 302C characteristics, which the data center 116C suitably stores. Further, a technician's preferences 302D may also be stored. Such preferences may correspond to, or may deviate, from a technician's ratings. For example, a technician may prefer not to perform tasks at night, but, may actually perform such tasks at a given technical rating, as based on monitoring. The data center 116C may also be configured to store task ratings 304 which may be based on technical 304A, social 304B, and environmental 304C characteristics. Likewise, user ratings 306 may be stored, as based on social 306A, preferences 306B and history (past job/tasks) 306C characteristics. Last, service site ratings 308 may be stored, as based on user system (technical) 308A, location 308B, and environmental 308C characteristics.

In accordance with at least one embodiment of the present disclosure, a process for managing technician logistics may include determining an ETC for a current task and, based thereon, an ETA for a next job. Such determinations may be made based upon an average statistical time for task completion by a technician, a determination of a current status level for a technician then performing the given task, and an evaluation of a current task complexity ("CTC").

The average statistical time for task completion may be based upon previous completions of the given task and/or a substantially similar task by one or more of the given technician, a team of technicians associated with a given service provider, an industry established average, or otherwise. For at least one embodiment, the average statistical time for task completion (herein, "ASTTC") may be expressed mathematically as per Equation 1.

$$ASTTC = \frac{\sum t_{task_1} + t_{task_2} + \ldots t_{task_n}}{n} \quad \text{Equation 1}$$

where:
$t_{task}$=the time required for a first through $n^{th}$ instance to complete the task or a substantially similar task; and
n=the number of instances completed.

The current status level for the technician, performing the current task for which an ETC is desired, may be based upon on one or more readings provided by one or more monitors associated with the given technician. For at least one embodiment, the current status level may be based on a current health status level determined from one or more readings from one or more biometric monitors 214A, posture monitors 214B, stress monitors 214C, activity monitors 214D, environment monitors 214E, or other monitors. As discussed above, one or more of such monitors may be provided in a single, integrated monitoring device, such as a smart band, smart watch, or otherwise. Current readings from one or more of such monitors may be used alone and/or in conjunction with past readings to provide an assessment of the given technician's current health status level.

For at least one embodiment, the current status level for the technician may be monitored, computed, interpreted, adjusted, or otherwise processed based upon a current stress level for the technician. As per above, such stress level may be based upon one or more monitored readings, past readings, and otherwise. For at least one embodiment, an impact of a technician's current stress level upon an ETC for a current task may be expressed mathematically as per Equation 2 as a function of a stress differential, S.

$$ETC = \left(\frac{ASTTC}{S \times T_n}\right) \times TCC \quad \text{Equation 2}$$

where:
S=|SE−SP| (the absolute value), where:
SE is an expected stress level for a given task; and
SP is a technician's present stress level;
Tn=an (optional) technician specific weighting factor; and
TCC=a Task Complexity Coefficient (as described below).

For at least one embodiment, the stress differential, S, has a value of at least one (1). For at least one embodiment, the expected stress level, SE, for a given task may be empirically determined as an integer ranging between one (1), indicating no expected stress, and one-hundred (100), indicating a critical stress level. For at least one embodiment, SE, may include one or more of the following ranges: Critical (ESC), High (ESH), Normal (ESN) and Low (ESL). For a given task, for example, SE and SP ranges may be quantified, as follows:
Critical, SC=>90%;
High, SH=60% to 90%;
Normal, SN=30% to 60%; and
Low, SL=below 30%.

It is to be appreciated that for at least one embodiment, an ETC increases and decreases with a technician's present stress level, SP.

Further, and for at least one embodiment, one or more of these levels may be uniquely determined and adjusted by a technician specific weighting factor, Tn. A Tn may be determined based on a technician rating which, as discussed above, may be determined for a given technician based upon past monitored performances for that technician. It is to be appreciated that a first technician may operate satisfactorily at a higher stress level than a second technician. Yet, for other reasons (which may be observable or quantifiable), the technician's stress differential level, S, may need to be adjusted accordingly by their Tn.

For at least one embodiment, a technician's present stress level, SP, may be periodically determined as a task progresses and may range, as an integer from one (1), indicating no present stress, to one-hundred (100) indicating a critical stress level. A technician's present stress level, SP, may be indicative of an amount of time needed for task completion. For example, a critical technician present stress level ("TSC"), may be indicative that the technician will not be able to complete the task. A high technician present stress level ("TSH") may be indicative that timely completion of the current task, by the given technician is not likely or possible. A normal technician present stress level ("TSN") may be indicative that a given task will be timely completed. A low technician present stress level ("TSL") may be indicative that a given task will be completed earlier than is commonly expected.

For at least one embodiment, a given task may be further characterized by a maximum stress, Smax, an average over a given time period, Savg, and/or a minimum stress level, Smin, at which a given task is to be completed. Such characteristics may be empirically determined or determined using one or more standards, as further described below. These task characterizations may be used in selecting technicians for tasks, managing performance of a technician for a then being performed given task, setting technician specific weighting factors, Tn, and otherwise. For example, a technician engaged in a hazardous task, and presenting a critical current stress level, TSC, or a high current stress level, TSH, may trigger a Tn that informs a service center person, as well as the technician themselves, that they are temporarily stopped from performing such task until the technician's present stress level, SP, returns to within an acceptable range. Similarly, a technician having a present stress level TSP that does not reach a certain minimum stress level, Smin, might be reassigned from a hazardous task—the low present stress level being indicative of a lack of task/hazard awareness by that technician.

elements, and other factors. Any of which may be used in accordance with a given implementation of an embodiment of the present disclosure in managing technician logistics.

More specifically and as discussed herein for purposes of illustration, one or more task parameters may be variously categorized as per Table 1 below into one or more TCs. Similar task parameter categorizations may be provided, for example, in Attachment A, Table 15 (values used below differ for purposes of illustration and simplicity of description herein), or otherwise.

TABLE 1

| No. | Task Parameter | Task Categorization (TC) | | | |
|---|---|---|---|---|---|
| | | Low | Normal | High | Critical |
| 1 | Physical: E.g., Total Energy per technician, per day, in Watts | <174 | 174-290 | 291-348 | >349 |
| 1.1 | External Physical Activity | — | — | — | — |
| 1.1.1 | Upper Torso, Male (in Watts) | <22 | 22-45 | 46-68 | >68 |
| | Upper Torso, Female (in Watts) | <13 | 13-27 | 28-40 | >40 |
| 1.1.2 | Full Torso, Male (in Watts) | <45 | 45-90 | 91-130 | >130 |
| | Full Torso, Female (in Watts) | <32 | 32-63 | 64-85 | >85 |
| 2 | Intellectual | — | — | — | — |
| 2.1 | Work Content | No decisions | Simple Decisions | Complex Decisions (checklist available) | Complex Decisions (no checklist available) |
| 2.2 | Signal Perception & Evaluation of Activity (after signal perceived) | No correction needed | Task Correction | Comparison of accepted and expected task parameters; Final eval of accepted task parameters | Comparison of interconnected parameters; Complex evaluation of job/multiple tasks |
| 2.3 | Mgmt. Function | None | Checking | Checking + Control | Control + Delegate |
| 2.4 | Schedule Flexibility | None | Change on Request | Independent | Responsible for results |
| 2.5 | Concentration Required | >50% | 51-75% | >75% | — |
| 3 | Emotional | — | — | — | — |
| 3.1 | Monotony Capacity (task repetitions) | >10 | 10-6 | 5-2 | — |
| 4 | Other | — | — | — | — |

For at least one embodiment, one or more industry, governmental or other health standards and/or regulations may be used in categorizing one or more stress levels for one more tasks, each being a "task categorization" ("TC"). One example of such regulations are provided by the Ukrainian government and may be found at the website, https://zakon.rada.gov.ua/laws/sjow/z0742-14 (herein, the Ukrainian standards, "UAS"), the entire contents of which are incorporated herein by reference and are provided, as machine translated by Google into the English language, in "Attachment A" filed herewith. It is to be appreciated that other regulations, industry standards, service provider standards, or the like may be used in classifying one or more stress levels for one or more tasks. As shown by the UAS, factors that may adversely affect performance of a given task may include one or more factors including physical, climate/environmental, location (such as elevation), the presence of radiation, noise, vibration, illumination, gasses, biological For at least one embodiment of the present disclosure, one or more of the above TCs may be converted into one or more task complexity coefficients ("TCCs") that may be used to determine any increase or decrease, if any, in an ASTTC for a given task. It is to be appreciated that one or more of the TCs may not apply to a given task. Further, one or more TCCs may or may not be calculatable for a given task parameter. Further one or more TCCs may be determined based upon empirical results, estimated results, based upon machine learning processes, using artificial intelligence processes, based upon results obtained for similarly situated technicians (such as, in terms of training, experience, body composition, or otherwise), and the like. Further, one or more of the TCCs may be common to a given population of technicians, unique for a subset of such population of technicians, individually determined for each technician, or otherwise. A non-limiting example of one or more TCCs, as applied to various task parameter categorizations, is provided in Table 2.

TABLE 2

| No. | Task Parameter | Task Complexity Coefficient (TCC) | | | |
|---|---|---|---|---|---|
| | | Low | Normal | High | Critical |
| 1 | Physical: E.g., Total Energy per technician, per day, in Watts | 1 | 1.67 | 1.87 | 2.17 |
| 1.1 | External Physical Activity | — | — | — | — |
| 1.1.1 | Upper Torso, Male(in Watts) | 1 | 2 | 2.76 | 2.76 |
| | Upper Torso, Female(in Watts) | 1 | 2 | 2.76 | 2.76 |
| 1.1.2 | Full Torso, Male(in Watts) | 1 | 2 | 2.8 | 2.8 |
| | Full Torso, Female(in Watts) | 1 | 2 | 2.8 | 2.8 |
| 2 | Intellectual | — | — | — | — |
| 2.1 | Work Content | 1 | 2 | 4 | HC |
| 2.2 | Signal Perception & Evaluation of Activity (after signal perceived) | 1 | 2 | 4 | 8 |
| 2.3 | Mgmt. Function | | Not computable | | |
| 2.5 | Concentration Required | 1 | 1.3 | 1.5 | HC |
| 3 | Emotional | HC | HC | HC | HC |
| 3.1 | Monotony Capacity (task repetitions) | 1 | 1.1 | 1.2 | HC |
| 4 | Other | — | — | — | — |

For at least one embodiment, various TCCs may be determined based upon an optimal task condition being assigned for a given TC with other coefficients estimated based thereon. For example, a TCC for a given task parameter at a low TC may be determined and used to estimate low, normal, high and critical TCCs. Similarly, a given task parameter estimated at a normal TC may be used to estimate a low, normal, high and/or critical TC. For certain TCs, estimation of a TCC may not be determinable—such TCC estimation/determination being deemed "HC" or beyond classification. For HC classifications, subjective standards may be used, for example, by service center personnel, in applying any adjustments, if any, to an ETC and/or ETA estimation.

For at least one embodiment, a TCC may be estimated during an initial training period for a technician with respect to a given task. The TCC may be updated, from time to time, based upon repetition of the given task by the given technician, further training, observation, or otherwise. Further, a TCC for a given task may be adjusted based upon real-world conditions. For example, an environmental change (such as the presence of lightning in an area where outdoor work is required) may impact a TCC for a given task. Such impacts may be used for later ETC and ETA determinations when similar outdoor tasks are required in a given area and during a period when similar environmental conditions may be expected.

The TCCs for a given task may be used by the service center in determining ETC, ETA, assigning of technicians to jobs and tasks, informing users of the same, and otherwise. For example, a given task may be performed by a first technician and a second technician. The technicians may each have different weighting factors, Tn, and the task may require application of different TCCs for each technician. Such variables may be used in Equation 2 to calculate the ETC for the current task.

For at least one embodiment, a determined ETC may be used in estimating an ETA for a next job for a next user. It is to be appreciated that a current job may involve multiple tasks, each of which having a corresponding ETC. Further, an ETA will typically depend upon determinations of any transit times, break times (for the technician), or the like. Thus, in accordance with at least one embodiment, the process for managing technician logistics may include the operations of FIG. 4.

Figure 4:
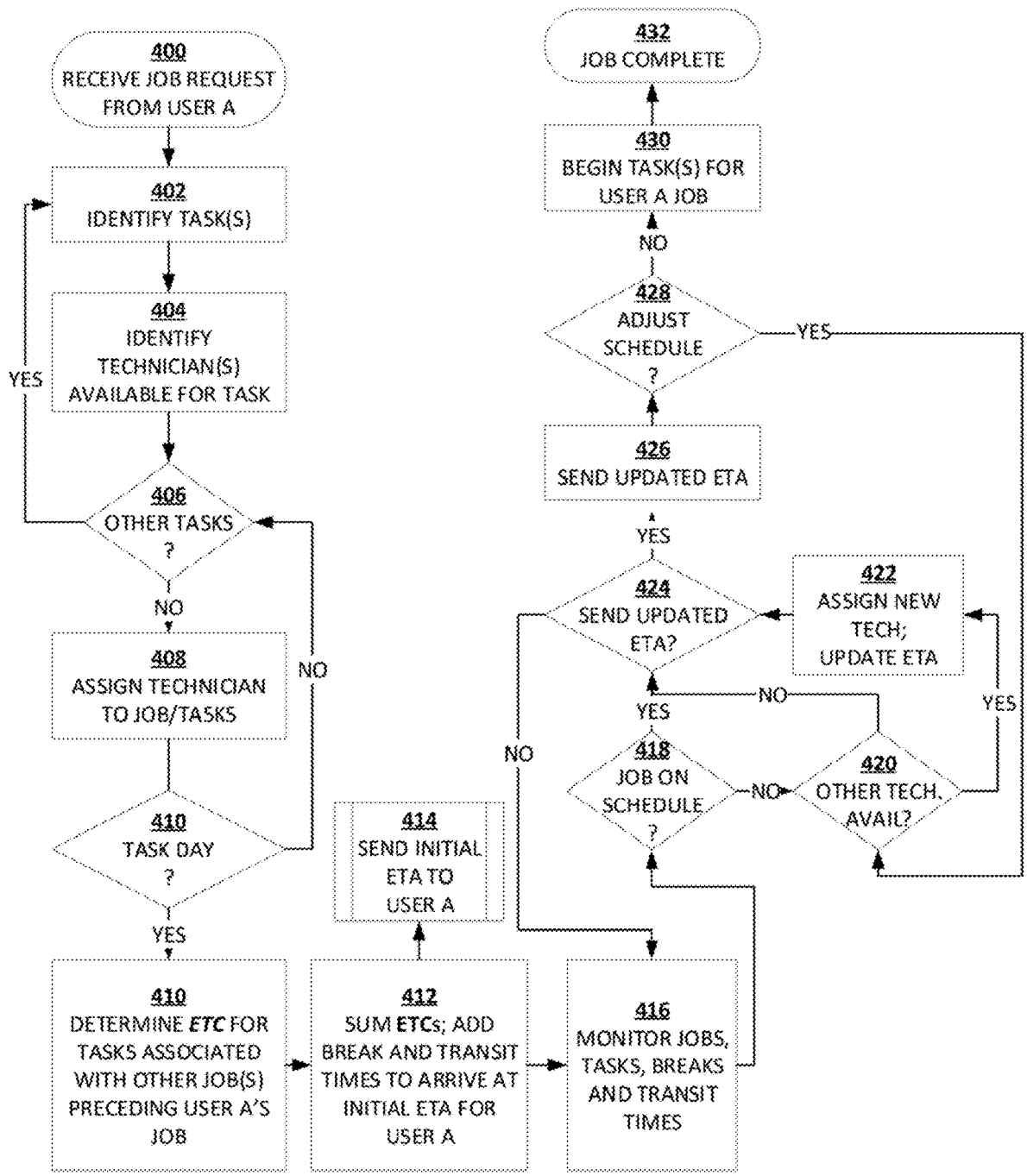
FIG. 4 is a flow chart providing one representation of a process for managing technician logistics that includes providing a user with an updated estimated time for arrival by a technician at a given service site and in accordance with at least one embodiment of the present disclosure.

In FIG. 4, a process for managing technician logistics is shown and in accordance with at least one embodiment of the present disclosure.

Per Operation 400, the process may include receiving a job request from a user, "User A", for at least one task to be performed at a specified location, the service site.

Per Operation 402, the job may be broken down into one or more tasks.

Per Operation 404, an identification may be made of one or more technicians that are available to perform the task(s). Such identification may be made using an iterative process wherein available days/time periods for the user are compared with available days/time periods for the one or more technicians qualified to perform the one or more tasks associated with the user requested job.

Per Operation 406, a further identification may be periodically made based upon other tasks, as may be requested by other users from time to time, for other jobs. That is, per at least one embodiment, the assignment of technicians to tasks may occur on an iterative basis, as based upon one or more other tasks, technician availability, and otherwise.

Per Operation 408, a determination is made as to whether the task day has arrived. For at least one embodiment, such determination may be made a day or more in advance with updated ETAs being provided to those one or more user with respect to which one or more jobs have been scheduled by the service provider.

Per Operation 410, a determination of an ETC is made for each task associated with another job that is to be performed before a User A job.

Per Operation 412, each ETC, any break time, transit time between other jobs, and the like are calculated to arrive at an initial ETA for the User A job.

Per Operation 414, the initial ETA may be communicated to User A.

Per Operation 416, one or more of a job then being performed by an assigned technician are monitored. For at least one embodiment, such monitoring may include periodic, on-demand, repetitive and/or on any other basis calculations of an ETC for the then being performed task by that technician. Further, transit times between jobs, and other time influencing variables may be monitored and updated on any desired basis.

Per Operation 418, a determination may be periodically, real-time or other made as to whether the User A job is still on schedule. If No, the process may include operation 420.

Per Operation 420, a determination may be made as to whether another technician is or will be available, such that the scheduled ETA for the user A job may be maintained. It is to be appreciated that, per Operation 420, a modification of a schedule of technicians for a given service provider may impact multiple jobs and the performance of multiple tasks associated therewith. Accordingly, for at least one embodiment, one or more artificial intelligence processes may be used in determining, when and whether a schedule adjustment is to occur. If a schedule adjustment is to occur, notification of other users with respect to ETAs for their respective jobs may be communicated. If no schedule adjustment is to occur, the process may proceed to Operation 424.

Per Operation 422, when a schedule adjustment is to occur, the new technician may be assigned to the User A job. It is to be appreciated that in assigning such new technician the system 100 may be configured to access information provided by the new technician themselves and/or any service vehicle associated therewith to determine whether any resupply or new supplying of such technician and/or service vehicle is needed. Based upon at least such considerations, an updated ETA may be generated.

Per Operation 424, a determination may be made as to whether an updated ETA is to be sent to User A. It is to be appreciated that updates may be provided to a given user on any desired basis. Such basis may be specified in view of one more user preferences. If an updated ETA is not to be sent, the process may include continuing to monitor jobs, tasks, breaks, etc. as per Operation 416.

Per Operation 426, an updated ETA may be sent to User A. It is to be appreciated that the updated ETA may be based upon a recalculated ETC for a current task being performed by a currently assigned technician, which may vary from an originally assigned technician, as per Operation 422. Further, an updated ETA may be based upon updated transit times, or the like, which may vary based upon traffic, road congestion, weather, and otherwise.

Per Operation 428, a determination may be made as to whether any additional schedule adjustments are needed. Such determination may be based upon non-ETC factors, such as User A message as to availability, or otherwise.

Per Operation 430, the one or more tasks associated with the User A job may begin. It is to be appreciated that ETCs for such tasks may be computed. Such ETCs may be communicated to other technicians, if any, whose scheduling may depend, at least in part, based upon completion or status of one or more tasks being performed for User A.

Per Operation 432, the one or more tasks associated with the User A job are completed, and the process for managing technician logistics, as applied in the providing of ETAs and ETCs to a give user for a given job ends.

It is to be appreciated that the operations described above and depicted in FIG. 4 are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A process, for managing technician logistics, comprising:
executing, by a hardware processor associated with a service provider, at least one non-transient computer executable instruction for:
receiving an estimated time of arrival (ETA) for an assigned technician at a first service site;
receiving environmental information for a current service site;
determining an expected stress level (SE) for a current task at the current service site in view of the environmental information;
determining a task complexity coefficient (TCC) for the current task;
determining, based on the expected stress level (SE), an average statistical time for task completion (ASTTC) for the current task;
receiving a technician rating (TN) for the assigned technician;
wherein the technician rating (TN) is determined based upon the environmental information and at least one machine learning process which utilizes at least one of a skill characteristic, a social characteristic, an environmental characteristic, and a preference previously determined for the assigned technician;
receiving a present stress level (SP) for the assigned technician while the assigned technician is performing the current task;
determining a stress differential (S), where: S=|SE−SP|;
determining an adjusted ASTTC (AASTTC), where: AASTTC=ASTTC/(S×TN);
determining an estimated time of completion (ETC) for the current task, where:
ETC=ASSTTC×TCC;
updating, based on the ETC, the ETA; and
communicating the ETA to a first user; and
wherein the first user has requested completion of a first task at the first service site.

2. The process of claim 1,
wherein the task complexity coefficient (TCC) is determined based on the present stress level (SP).

3. The process of claim 1,
wherein the expected stress level (SE) is empirically determined.

4. The process of claim 3,
wherein the present stress level (SP) is determined based upon data provided by at least one technician monitor.

5. The process of claim 4,
wherein the at least one technician monitor includes a biometric monitor, a posture monitor, a stress monitor, an activity monitor, and an environment monitor.

6. The process of claim 5,
wherein each of the expected stress level (SE) and the present stress level (SP) fall within one of a low stress level, a normal stress level, a high stress level, and a critical stress level.

7. The process of claim 6,
wherein the technician specific weighting factor (Tn) is based upon at least one technician rating.

8. The process of claim 2,
wherein the task complexity coefficient (TCC) is based upon at least one task categorization (TC).

9. The process of claim 8,
wherein the TCC is determined based upon empirical results.

10. The process of claim 8,
wherein the TC includes a low category, a normal category, a high category and a critical category; and
wherein conditions under which a given task parameter falls into at least one of the low category, normal category, high category and critical category are predetermined.

11. The process of claim 9,
wherein the conditions under which a given task parameter falls into at least one of the low category, normal category, high category and critical category are specified by a regulatory body.

12. A system for managing technician logistics comprising:
a service provider system comprising a hardware processor;
a technician device for an assigned technician communicatively coupled to the service provider system;
wherein the technician device is coupled to and receives monitored data from
a biometric monitor, a posture monitor, a stress monitor, an activity monitor, and an environment monitor;
wherein the technician device is further configured to communicate the monitored data to the service provider system;
a user device for a first user, communicatively coupled to the service provider system;
wherein the service provider system is configured to execute, using the hardware processor, non-transient computer executable instructions for:
determining an estimated time of completion (ETC) for the assigned technician for a current task at a current service site;
wherein, ETC=ASTTC×TCC/(S×TN);
wherein ASTTC is an average statistical time for task completion for the current task;
wherein TCC is a task complexity coefficient for the current task;
wherein S is a stress differential, and where: S=|SE−SP|;
wherein SE is an expected stress level for the current task;
wherein SP is a present stress level for the assigned technician; and
wherein SP is determined based on the monitored data; and
wherein TN is a technician specific weighting factor determined upon environmental information provided by the environmental monitor and at least one machine learning process which utilizes at least one of a skill characteristic, a social characteristic, an environmental characteristic, and a preference previously determined for the assigned technician; and
based upon the ETC, determining an estimated time of arrival (ETA) for the assigned technician at a first service site;
wherein the first service site is associated with the first user; and
communicating the ETA to the first user device;
wherein the first user has requested completion of a first task at the first service site.

13. The system for managing technician logistics of claim 12,
wherein each of the expected stress level (SE) and the present stress level (SP) fall within one of a low stress level, a normal stress level, a high stress level, and a critical stress level;
wherein the technician specific weighting factor (Tn) is based upon at least one technician rating for at least one skill characteristic;
wherein the task complexity coefficient (TCC) is based upon at least one task categorization (TC);
wherein the TC includes at least two categories; and
wherein conditions under which a given task parameter falls into at least one of at least two categories is specified by a regulatory body.

* * * * *